Sept. 14, 1965  R. S. RAMSAY  3,205,761
ANCHOR NUT FASTENER INSTALLATION
Filed March 5, 1962

Inventor:
Robert S. Ramsay,
by Walter P. Jones
Atty.

United States Patent Office 3,205,761
Patented Sept. 14, 1965

3,205,761
ANCHOR NUT FASTENER INSTALLATION
Robert S. Ramsay, Cambridge, Mass., assignor to United-Carr Incorporated, a corporation of Delaware
Filed Mar. 5, 1962, Ser. No. 177,368
1 Claim. (Cl. 85—33)

This invention relates to improvements in bolt fastened installations, which include a threaded fastener member anchored in a recess in a work piece.

An object of the invention is to provide an improved anchored threaded fastener installation, which includes a work piece having a recess therein into which is fitted and expanded a threaded fastener device having a flange portion expanded laterally into the work piece adjacent to the bottom of the recess. The flange is divided into expandable portions the outer peripheral edges of which are longer than those portions of the flanges where they join a threaded portion of the fastener device to provide a very strong engagement of the fastener device with the work piece.

Another embodiment of the invention is to provide one or more work piece engaging prongs extending from the flange into the work adjacent to the bottom of the recess, which prongs present a planar abutment face in the direction of rotation of a co-operating threaded member to resist rotation of the fastening device when a cooperating threaded member is being threaded into engagement with the fastening device to expand the flange sections.

In the drawings which illustrate a preferred embodiment of the invention:

Figure 1:
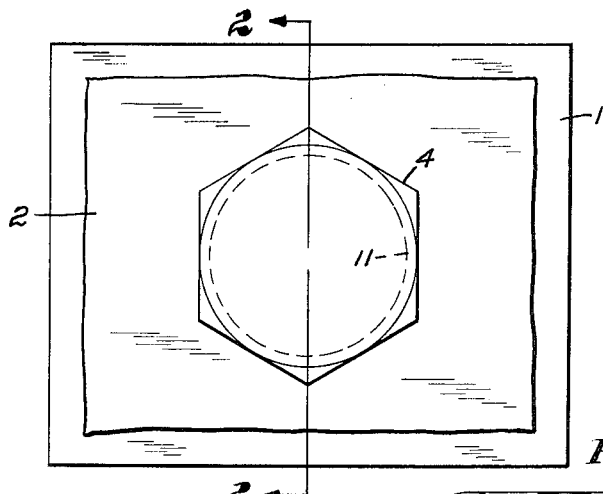
FIG. 1 is an enlarged plan view of the improved installation.
Figure 2:
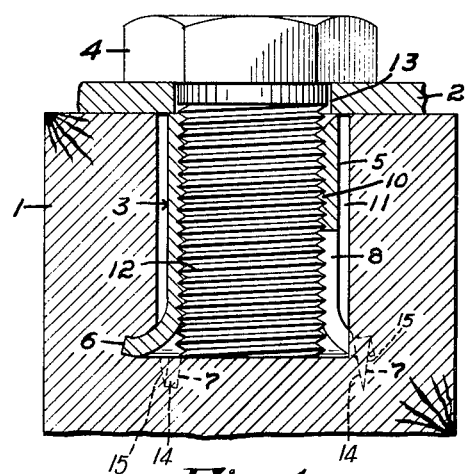
FIG. 2 is a section taken on the line 2—2 of FIG. 1.

The particular embodiment of the invention illustrated by the drawings includes a work support 1, which may be of wood, plastic, or other similar material, a part 2 to be held in place upon the work support 1, a sheet metal expansible threaded nut 3 and a bolt or screw member 4, as shown in FIG. 2.

Figure 3:
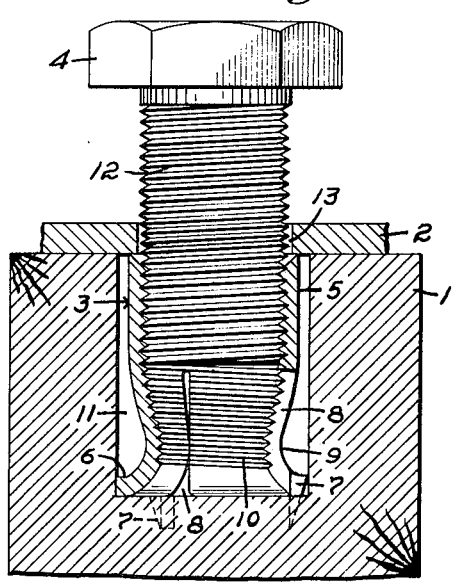
FIG. 3 is a section similar to FIG. 2 showing the arrangement of the parts prior to expansion of the fastening device.
Figure 4:
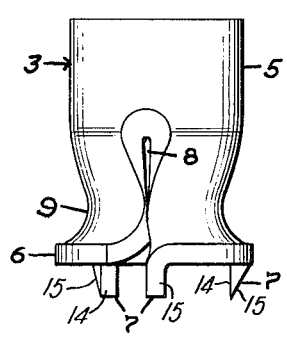
FIG. 4 is a side elevation of an improved threaded expansible fastening device.
Figure 5:
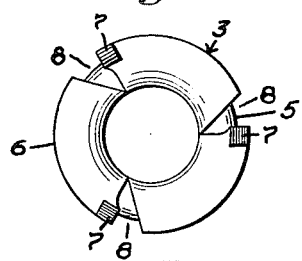
FIG. 5 is a bottom plan view of the device shown in FIG. 4.

While installations of this general type are known in the prior art, it is believed that the particular nut member illustrated has several advantages because it is formed of sheet metal, is one piece in construction, has a novel segmented flange construction and has means for resisting rotation during the expanding operation of the device. The particular nut member selected for illustration includes a body or barrel portion 5, a flange 6 and work engaging prongs 7, as shown in FIGS. 3, 4 and 5. The flange is divided into three equal segments by slits 8 that also extend into the barrel portion 5 of the nut 3 and the barrel portion is pinched inwardly to provide for expansion of the flange 6. The internal wall of the barrel is provided with a thread 10 prior to the barrel being pinched inwardly.

It will be noted that the outer peripheral length of each of the segments of the flange is longer than the distance where each segment joins the barrel of the nut thereby to provide a maximum outer engagement of each segment with the work piece. This is a particularly important feature of the invention because tests have indicated that devices made with these flange proportions substantially increase the resistance to the nut pulling out of the wood and, therefore, will support very heavy loads. It is also important that the flange sections engage in the work adjacent to the bottom of the recess 11 as shown in FIG. 2 as will be understood by anyone skilled in the art.

The installation may be assembled by first inserting the nut 3 into the recess 11 in the work support 1 then placing the part 2 in a position and entering the threaded shank 12 of the bolt 4 through an aperture 13 in the part 2 and threading it into the sheet metal nut 3 as shown in FIG. 3. Thereafter, as the bolt 4 is rotated, it expands the shank 5 of the nut and the flange sections laterally outward so that when the end of the threaded shank 12 of the bolt reaches the position shown in FIG. 2, and the parts are tightly clamped together, the flange sections will be forced outwardly to their maximum positions in the work. Each of the flange sections has a prong 7 bent therefrom and extending downwardly, generally parallel to the axis of the nut and each prong has a planar abutment face 14 facing in the direction of rotation of the bolt 4, and an inclined face 15 adjacent the face 14 providing a pointed configuration at the terminal end of each of the prongs. Thus, as the bolt 4 is rotated into the shank 12 the prongs 7, which are engaged in the material of the work adjacent to the bottom of the recess 11, will resist relative rotation between the nut and the bolt so that the flange sections are expanded laterally without any appreciable turning action.

Another important feature of the invention is the fact that the nut 3 acts as a lock nut to strongly grip the bolt because of the fact the body portion 5 was originally squeezed inwardly at 9 to provide a constricted bore adjacent the flange 6 which has a diameter less than the entering threaded diameter of the body portion 5. Thus during the threaded action there is a strong interengagement between the threads at the squeezed in portion 9 and the threads of the bolt effectively resist loosening by vibration.

While the flange might be divided into two sections, it has been found that dividing it into three sections makes it easier to install the nut, gives a unform grip in the work piece and generally provides a strong installation utilizing the material of the work piece in combination with the particular construction of the flange sections.

If it is necessary to provide more holding power between the work support 1 and the expansible nut 3, the recess 11 may be made slightly smaller in diameter than the normal diameter of the flange 6. In this case the fastener has to be driven into the recess 11 thereby cutting grooves (not shown) so that the flange will be interlocked with the work suport and also assist in providing relative rotation when the flange 6 is being expanded into the support 1.

While a specific construction of the invention has been illustrated and described, it should be understood that the novel features of the invention are best defined by the following claim.

I claim:

An anchored locking nut installation comprising, in combination, a workpiece having a recess therein, and a sheet metal threaded lock nut located in the recess, said lock nut having a hollow threaded barrel portion, a flange adjacent one end of the said barrel portion and a constricted bore adjacent the flanged end which has a diameter less than the threaded diameter at the end opposite said flange, said barrel and flange being divided by slits into yieldable segments whereby the barrel portion lockingly grips a screw threaded into said barrel and said flange segments are pressed outwardly into substantial engagement with the workpiece, and each yieldable flange segment having a prong extending downwardly therefrom into the workpiece adjacent a slit to move with said segments when they are pressed outwardly, said prongs being bent from the flange segments to extend generally parallel to the axis of the nut, and providing planar abutment face in the direction of rotation of a screw, and having an inclined face adjacent said planar abutment face providing a pointed configuration at the terminal ends of said prongs.

References Cited by the Examiner

UNITED STATES PATENTS

| 1,940,307 | 12/33 | Keeler | 85—83 |
| 2,207,476 | 7/40 | Bernstein | 36—59 |
| 2,470,924 | 5/49 | Flogaus | 85—83 |
| 2,561,433 | 7/51 | Uhle | 151—41.72 |
| 3,148,579 | 9/64 | Giovannetti | 85—83 |

FOREIGN PATENTS

| 634,116 | 3/50 | Great Britain. |
| 264,239 | 1/50 | Switzerland. |

EDWARD C. ALLEN, *Primary Examiner.*